United States Patent
Ito et al.

(10) Patent No.: US 9,067,577 B2
(45) Date of Patent: Jun. 30, 2015

(54) VEHICLE BRAKING SYSTEM

(75) Inventors: Yuki Ito, Wako (JP); Yuki Hotani, Wako (JP); Shinichi Sato, Tochigi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 42 days.

(21) Appl. No.: 13/814,529

(22) PCT Filed: Aug. 4, 2011

(86) PCT No.: PCT/JP2011/067862
§ 371 (c)(1),
(2), (4) Date: Feb. 6, 2013

(87) PCT Pub. No.: WO2012/018080
PCT Pub. Date: Feb. 9, 2012

(65) Prior Publication Data
US 2013/0134768 A1    May 30, 2013

(30) Foreign Application Priority Data

Aug. 6, 2010 (JP) ................................ 2010-177008

(51) Int. Cl.
*B60T 13/74* (2006.01)
*B60T 13/58* (2006.01)
(Continued)

(52) U.S. Cl.
CPC ............. *B60T 13/586* (2013.01); *B60L 3/0092* (2013.01); *B60L 7/18* (2013.01); *B60L 7/26* (2013.01); *B60T 8/1755* (2013.01); *B60T 8/4081* (2013.01);
(Continued)

(58) Field of Classification Search
CPC ....... B60T 13/586; B60T 13/745; B60T 7/06; B60L 7/18; B60L 7/26; Y02T 10/7077
USPC .......................... 303/3, 6.01, 14, 15, 152, 155
See application file for complete search history.

(56) References Cited

U.S. PATENT DOCUMENTS 6,315,371 B1  11/2001  Wachi et al.
2002/0033639 A1*  3/2002  Mizutani et al. ........... 303/113.1
(Continued)

FOREIGN PATENT DOCUMENTS

EP  1103436  5/2001
JP  8-198075  8/1996
(Continued)

OTHER PUBLICATIONS

International Search Report filed in PCT/JP2011/067862.

*Primary Examiner* — Pamela Rodriguez
(74) *Attorney, Agent, or Firm* — Rankin, Hill & Clark LLP

(57) ABSTRACT

A vehicle braking system includes a master cylinder for producing an upstream hydraulic pressure corresponding to an operation given to a brake operation part, a shut-off valve provided between the master cylinder and a wheel cylinder, a hydraulic-pressure source for producing a downstream hydraulic pressure between the shut-off valve and the wheel cylinder in a close instruction receiving condition of the shut-off valve, and a controller for setting a target value of the downstream hydraulic pressure based on an operation amount and controlling the downstream hydraulic pressure based on the target value. According to the vehicle braking system, a driver is prevented from feeling discomfort through a brake operation without an increase in a power consumption of a shut-off valve provided between the master cylinder and the wheel cylinder.

7 Claims, 5 Drawing Sheets

(51) Int. Cl.
*B60L 3/00* (2006.01)
*B60L 7/18* (2006.01)
*B60L 7/26* (2006.01)
*B60T 8/1755* (2006.01)
*B60T 8/40* (2006.01)
*B60T 7/06* (2006.01)
*B60L 11/14* (2006.01)
*B60L 11/18* (2006.01)

(52) U.S. Cl.
CPC ......... *B60T 13/745* (2013.01); *B60T 2270/604* (2013.01); *B60T 2270/613* (2013.01); *B60T 7/06* (2013.01); *B60L 11/14* (2013.01); *B60L 11/1877* (2013.01); *B60L 2210/40* (2013.01); *Y02T 10/7077* (2013.01); *Y02T 10/7005* (2013.01); *Y02T 10/705* (2013.01); *Y02T 10/7241* (2013.01); *Y02T 10/70* (2013.01)

(56) References Cited

U.S. PATENT DOCUMENTS

2012/0161506 A1* 6/2012 Tanaka et al. ................. 303/14
2012/0256477 A1* 10/2012 Miyazaki et al. ........... 303/6.01

FOREIGN PATENT DOCUMENTS

| JP | 2004-328884 | 11/2004 |
| JP | 2005-035393 | 2/2005 |
| JP | 2007-230419 | 9/2007 |
| JP | 2008-105523 | 5/2008 |
| JP | 2009-137377 | 6/2009 |
| JP | 2009-279966 | 12/2009 |
| WO | 2010/064526 | 6/2010 |

* cited by examiner

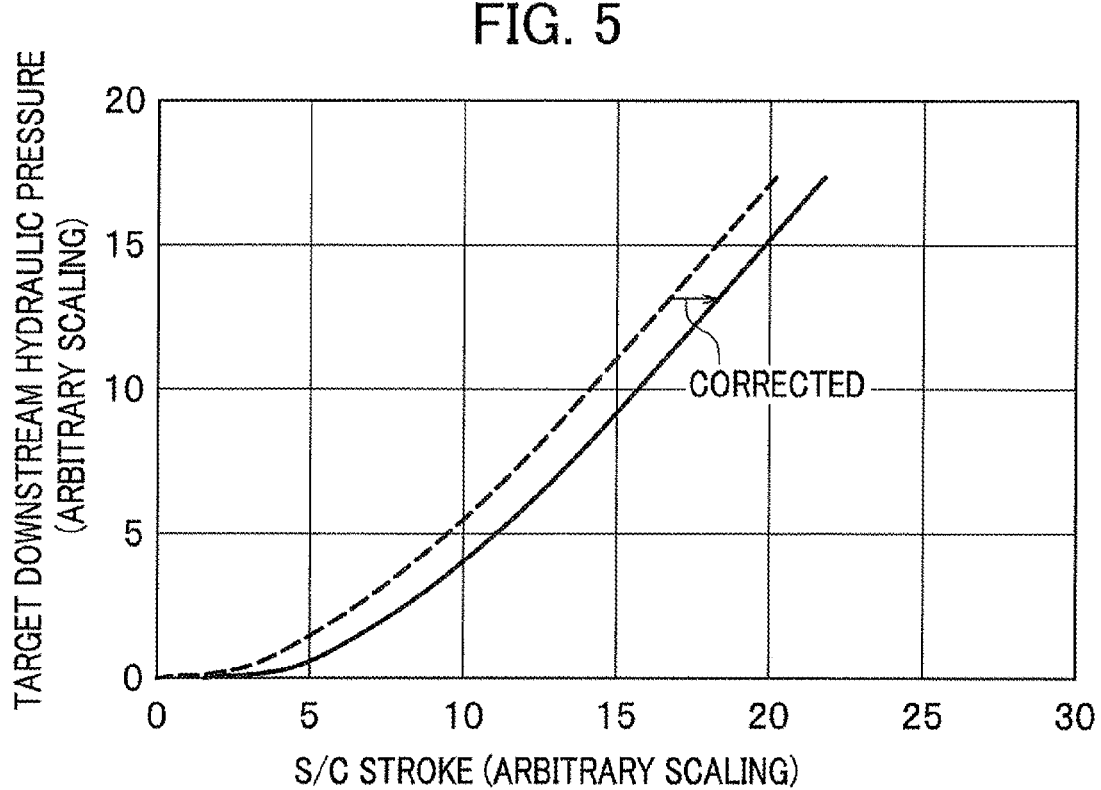

VEHICLE BRAKING SYSTEM

TECHNICAL FIELD

The present invention relates to a vehicle braking system which has a shut-off valve between a master cylinder and a wheel cylinder, and which further has a hydraulic-pressure source between the shut-off valve and the wheel cylinder.

BACKGROUND ART

Vehicle braking systems has a master cylinder connected with wheel cylinders through hydraulic-pressure channels. When a driver operates a brake operation part, an upstream hydraulic pressure is produced in the master cylinder. This upstream hydraulic pressure is shut-off by a shut-off valve in order to not directly actuate the wheel cylinders, but a downstream hydraulic pressure is produced in a hydraulic-pressure source in addition to other physical quantities with the operation amount of the brake operation part to actuate the wheel cylinders. Such a control scheme is referred to as a brake-by-wire (BBW) scheme, and vehicle braking systems realizing such a control scheme have been proposed (see, for example, Patent Literature 1).

PRIOR ART DOCUMENT

Patent Literature

Patent Literature 1: JP 2009-137377 A

DISCLOSURE OF INVENTION

Problem to be Solved by the Invention

Conventional vehicle braking systems are servo systems, and in a normal operation, amplify the pedal depressing force by the driver to give the amplified force to the wheel cylinders. Hence, according to the vehicle braking systems, a relationship having an upstream hydraulic pressure which is less than a downstream hydraulic pressure (upstream hydraulic pressure<downstream hydraulic pressure) is maintained. A shut-off valve is provided between the master cylinder for producing the upstream hydraulic pressure and the wheel cylinders to which the downstream hydraulic pressure is applied, and a pressure difference between the upstream hydraulic pressure and the downstream hydraulic pressure acts on the valve element in the shut-off valve. In general, the shut-off valve is closed in order to disconnect the master cylinder with the wheel cylinders. In order to securely maintain this closed condition, the valve element is disposed at the downstream hydraulic pressure side relative to the valve seat, and the shut-off valve is provided in such a way that the valve element of the shut-off valve is pressed against the valve seat in a contacting manner using the pressure difference between the upstream hydraulic pressure and the downstream hydraulic pressure. The pressure difference and thrust force are applied to the valve element in a direction being pressed against the valve seat in a contacting manner in the closed condition, and thus the closed condition is securely maintained.

In recent years, hybrid vehicles and electric vehicles using a motor for driving such a vehicle are put in the market. According to such vehicles, the motor is allowed to function as a braking motor (regenerative braking) at the time of braking to generate regenerative braking force, and thus a good fuel economy is accomplished.

According to the vehicles, such as the hybrid vehicles and the electric vehicles, however, not only the regenerative braking force but also hydraulic-pressure braking force produced by applying hydraulic pressure (downstream hydraulic pressure) to the wheel cylinders is utilized, and the regenerative braking force and the hydraulic-pressure braking force are produced in a well-balanced manner depending on the driving condition of the vehicle. In view of the addition of the regenerative braking force to the conventional hydraulic-pressure braking force, the hydraulic-pressure braking force itself is reduced by what corresponds to such an addition.

Hence, when regenerative brake is applied, unlike the above-explained normal operation, the downstream hydraulic pressure necessary for producing the hydraulic-pressure braking force may not exceed the upstream hydraulic pressure produced by the pedal depressing force by the driver in some cases. When the upstream hydraulic pressure becomes greater than the downstream hydraulic pressure and such a pressure difference becomes greater than the thrust force applied to the valve element, the shut-off valve becomes unable to maintain the closed condition and is opened, and thus the brake fluid travels from the upstream side to the downstream side. When the amount of the brake fluid at the downstream side increases, the downstream hydraulic pressure produced by the hydraulic-pressure source shifts, which may cause the driver to feel discomfort.

The thrust force applied to the valve element may be increased in such a way as to cause the shut-off valve to always maintain the closed condition, but the power consumption increases and the dimension of the shut-off valve needs to be increased together with an increase in the thrust force, and thus it is not practical when placed in the vehicle. A normally opened electromagnetic valve that is closed by electric power is utilized as the shut-off valve. This is based on a fail-safe thought. When the brake system of the vehicle breaks down and the brake-by-wire (BBW) control scheme becomes unfunctional, the normally opened shut-off valve is opened to connect the master cylinder with the wheel cylinders, and when the driver gives an operation as usual, the upstream hydraulic pressure produced at the master cylinder is applied to the wheel cylinders, and thus the braking is applied to the vehicle.

It is desirable not to cause the driver to feel discomfort through a brake operation when such a shut-off valve is used without an increase in a power consumption of the shut-off valve and the increase in size of the shut-off valve.

It is an object of the present invention to provide a vehicle braking system which prevents a driver from feeling discomfort through a brake operation without the increase in the power consumption of a shut-off valve provided between a master cylinder and a wheel cylinder and the increase in size of the shut-off valve.

Means for Solving the Problem

A vehicle braking system of the present invention includes: a master cylinder for producing an upstream hydraulic pressure corresponding to an operation given to a brake operation part; an operation amount detector for detecting an operation amount of the brake operation part; a shut-off valve provided between the master cylinder and a wheel cylinder; a hydraulic-pressure source for producing a downstream hydraulic pressure between the shut-off valve and the wheel cylinder in an close instruction receiving condition of the shut-off valve; and a controller for setting a control target value corresponding to the downstream hydraulic pressure based on the operation amount and controlling the downstream hydraulic pressure based on the control target value, wherein the controller includes: an upstream-hydraulic-pressure detector-estimator for detecting or estimating the upstream hydraulic pressure; and a regulator for adjusting the control target value in accordance with the operation amount or the upstream hydraulic pressure to regulate a pressure difference between the upstream hydraulic pressure and the downstream hydraulic pressure.

According to this structure, when a driver operates the brake operation part, upstream hydraulic pressure is produced at the master cylinder, which is detected or estimated by the upstream-hydraulic-pressure detector-estimator. The upstream hydraulic pressure is blocked by the shut-off valve, and does not directly actuate the wheel cylinder. The operation amount detector detects the operation amount of the brake operation part corresponding to the upstream hydraulic pressure, and the controller sets a control target value corresponding to the downstream hydraulic pressure based on the operation amount, and allows the hydraulic-pressure source to produce the downstream hydraulic pressure controlled based on the control target value. Next, the regulator regulates the pressure difference between the upstream hydraulic pressure produced at the master cylinder and the downstream hydraulic pressure corresponding to the control target value set by the controller, thereby making the pressure difference always less than the thrust force applied to the valve element of the shut-off valve, and the shut-off valve maintains the closed condition without being opened. It becomes possible to suppress a down-flow of the brake fluid from the upstream side to the downstream side, and thus the shifting of the downstream hydraulic pressure by an increase in the brake fluid at the downstream side is reduced. That is, the driver is prevented from feeling discomfort through a brake operation is suppressed without the increase in the power consumption (load) and the increase in size thereof.

According to the present invention, it is preferable that the regulator should drive the hydraulic-pressure source in a direction of reducing the pressure difference when the pressure difference is greater than a regulation value.

When the regulation value is set to be substantially equal to the thrust force applied to the valve element of the shut-off valve, the hydraulic-pressure source is driven in a direction of decreasing the pressure difference when the pressure difference is greater than the thrust force applied to the valve element of the shut-off valve, and the pressure difference is maintained (regulated) to be always less than the thrust force applied to the valve element of the shut-off valve. Hence, the shut-off valve is maintained in the closed condition.

According to the present invention, it is preferable that the controller should include a braking-force distributor for setting a distribution between regenerative braking force to a wheel by an electric motor that drives the wheel and hydraulic-pressure braking force to the wheel by the downstream hydraulic pressure transferred from the hydraulic-pressure source to the wheel cylinder based on the operation amount, set the control target value based on the distribution to the hydraulic-pressure braking force, and perform re-distribution so as to reduce the distribution to the regenerative braking force when the regulator regulates the pressure difference.

According to this structure, the total braking force acting on the vehicle which is the total of the regenerative braking force and the hydraulic-pressure braking force is prevented from varying when the pressure difference is regulated, thereby reducing the discomfort given to the driver at the time of braking.

According to the present invention, it is preferable that the hydraulic-pressure source should include an electric actuator that is driven to produce the downstream hydraulic pressure between the shut-off valve and the wheel cylinder, the electric actuator should include a motor cylinder for driving a slave piston by thrust force of a motor to produce the downstream hydraulic pressure and an actuated amount detector for detecting an actuated amount of the slave piston, and the controller should set the actuated amount from the control target value based on a correspondence relationship between the control target value and the actuated amount, and allow the hydraulic-pressure source to produce the downstream hydraulic pressure based on the actuated amount.

According to the present invention, the possession of the correspondence relationship in advance between the control target value and the actuated amount enables the shut-off valve to maintain the closed condition, and the down-flow of the brake fluid from the upstream side to the downstream side is suppressed. Accordingly, the shifting of the downstream hydraulic pressure by the increase in the brake fluid at the downstream side is reduced, and the actuated amount is always set precisely through the correspondence relationship between the control target value and the actuated amount. Hence, the hydraulic-pressure source produces the precise downstream hydraulic pressure. It becomes possible for the vehicle braking system to prevent the driver from feeling discomfort through a brake operation, and thus the feeling during the operation is improved.

According to the present invention, it is preferable that the controller should include a corrector for correcting the correspondence relationship between the control target value and the actuated amount when the pressure difference is equal to or less than the regulation value.

According to such a structure, even if the correspondence relationship between the control target value and the actuated amount is shifted due to aging variation, it is corrected. Accordingly, a precise actuated amount is always obtained, and thus the hydraulic-pressure source produces a precise downstream hydraulic pressure.

Effect of the Invention

According to the present invention, a vehicle braking system is provided which prevents a driver from feeling discomfort through a brake operation without the increase in the power consumption of a shut-off valve provided between a master cylinder and a wheel cylinder and the increase in size of the shut-off valve.

BRIEF DESCRIPTION OF DRAWINGS

FIG. 5 is a graph illustrating a correspondence relationship (target downstream hydraulic pressure/stroke map) between a target downstream hydraulic pressure clarifying the stroke of a slave cylinder (hydraulic-pressure source) S/C necessary for producing a downstream hydraulic pressure reaching a target downstream hydraulic pressure (a target value) and the stroke of the S/C.

BEST MODE FOR CARRYING OUT THE INVENTION

Figure 1:
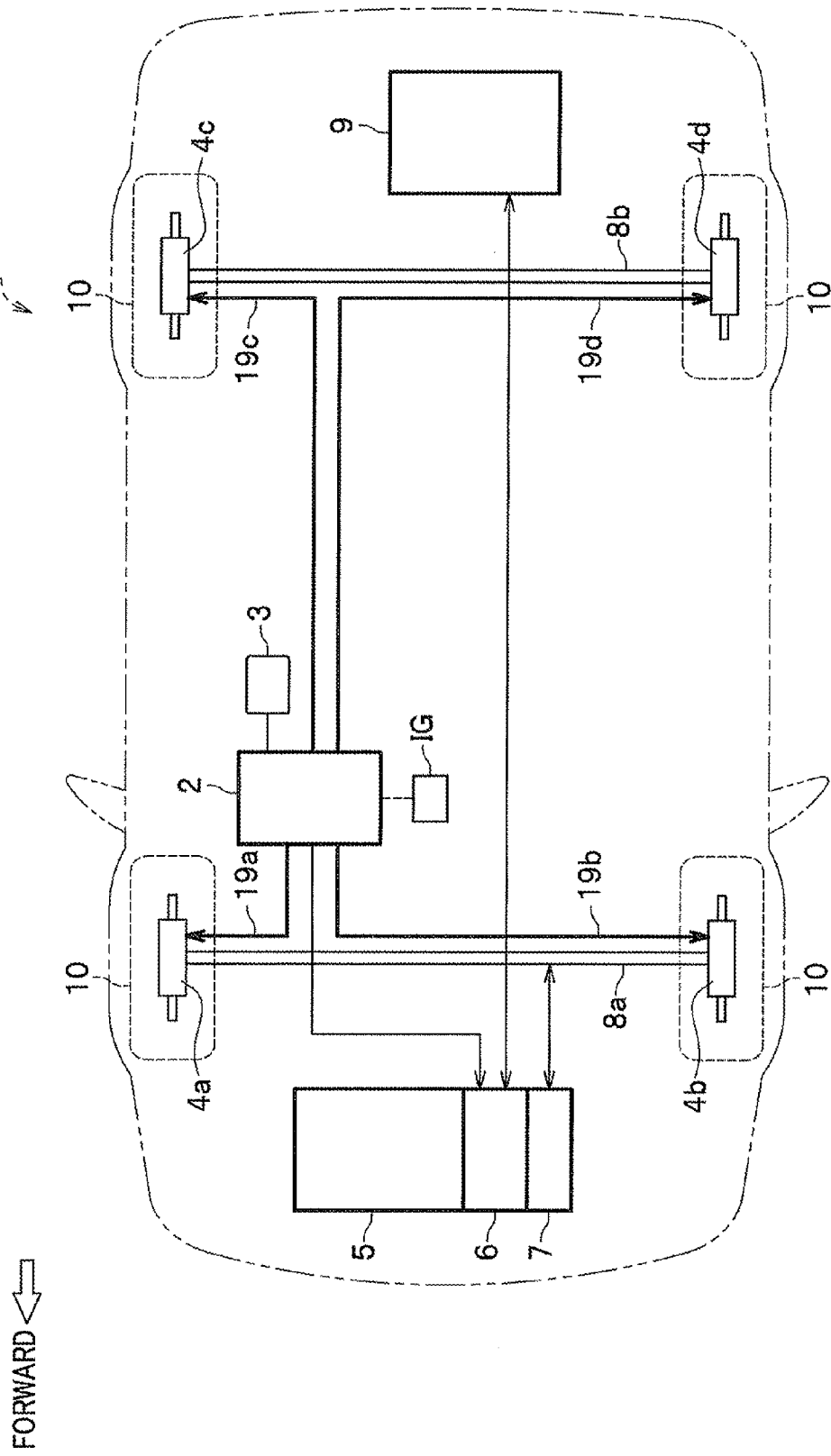
FIG. 1 is a structural diagram illustrating a vehicle equipped with a vehicle braking system according to an embodiment of the present invention.

Next, a detailed explanation will be given of an embodiment of the present invention with reference to the accompanying drawings as needed. The common portion throughout respective figures will be denoted by the same reference numeral, and the duplicated explanation thereof will be omitted.

FIG. 1 is a structural diagram illustrating a vehicle 1 equipped with a vehicle braking system 2 according to an embodiment of the present invention. The vehicle 1 includes four wheels 10, and the two front wheels 10 are coupled with an axle 8a, while the two rear wheels 10 are coupled with an axle 8b. The axle 8a receives drive force generated by at least either one of an engine 5 or a motor (electric motor) 6 through a transmission 7, transfers such drive force to the two front wheels 10 to rotate the wheels. Moreover, the axle 8a transfers, as regenerative energy, the rotation energy (kinetic energy) of the two front wheels 10 to the transmission 7, the transferred energy is further transferred to the motor (electric motor) 6. The regenerative energy is converted from kinetic energy to electric energy in the motor (electric motor) 6, and is stored in a battery 9, thereby braking the two front wheels 10. That is, the two front wheels 10 and the axle 8a are subjected to braking by the regenerative braking through the motor (electric motor) 6. The regenerative energy stored in the battery 9 is utilized when the motor (electric motor) 6 generates the above-explained drive force. As illustrated in FIG. 1, in the present embodiment, the explanation is given of an example case in which the vehicle 1 is a hybrid vehicle, but the present invention is not limited to this case. That is, the vehicle braking system 2 of the present invention is applied to an electric vehicle having the engine 5 omitted from FIG. 1.

The four wheels 10 are provided with respective wheel cylinders 4a, 4b, 4c, and 4d. The wheel cylinder 4a is connected to the vehicle braking system (main device) 2 through a hydraulic-pressure channel 19a, and when the hydraulic pressure in the wheel cylinder 4a is increased through the hydraulic-pressure channel 19a by the vehicle braking system (main device) 2, the wheel cylinder 4a is actuated to perform braking on the corresponding wheel 10. Likewise, the wheel cylinder 4b is connected to the vehicle braking system (main device) 2 through a hydraulic-pressure channel 19b, and when the hydraulic pressure in the wheel cylinder 4a is increased through the hydraulic-pressure channel 19b by the vehicle braking system (main device) 2, the wheel cylinder 4b is actuated to perform braking on the corresponding wheel 10. The wheel cylinder 4c is also connected to the vehicle braking system (main device) 2 through a hydraulic-pressure channel 19c, and when the hydraulic pressure in the wheel cylinder 4c is increased through the hydraulic-pressure channel 19c by the vehicle braking system (main device) 2, the wheel cylinder 4c is actuated to perform braking on the corresponding wheel 10. The wheel cylinder 4d is also connected to the vehicle braking system (main device) 2 through a hydraulic-pressure channel 19d, and when the hydraulic pressure in the wheel cylinder 4b is increased through the hydraulic-pressure channel 19d by the vehicle braking system (main device) 2, the wheel cylinder 4d is actuated to perform braking on the corresponding wheel 10. That is, the four wheels 10 and the axles 8a and 8b are subjected to braking by the hydraulic-pressure braking force produced by the vehicle braking system (main device) 2 and the wheel cylinders 4a, 4b, 4c, and 4d.

Hence, the two front wheels 10 and the axle 8a are subjected to braking control through two braking schemes which are regenerative braking using the motor (electric motor) 6 and braking by hydraulic-pressure braking force produced using the wheel cylinders 4a, 4b, 4c, and 4d. The braking control is performed by the vehicle braking system (main device) 2, and more specifically, a control of changing the distribution between the regenerative braking force by regenerative braking and the hydraulic-pressure braking force by the wheel cylinders 4a, 4b, 4c, and 4d, and of terminating the regenerative braking is performed.

The vehicle braking system (main device) 2 is provided with a brake pedal (brake operation part) 3 which is operated by the driver of the vehicle 1. The brake pedal 3 is input means to the vehicle braking system (main device) 2, and the wheel cylinders 4a, 4b, 4c, and 4d serve as output means. The vehicle 1 is started when an ignition switch IG is turned on, and at this time, the vehicle braking system 2 is also activated. By turning off the ignition switch IG, the vehicle 1 terminates its function including the vehicle braking system 2.

Figure 2:
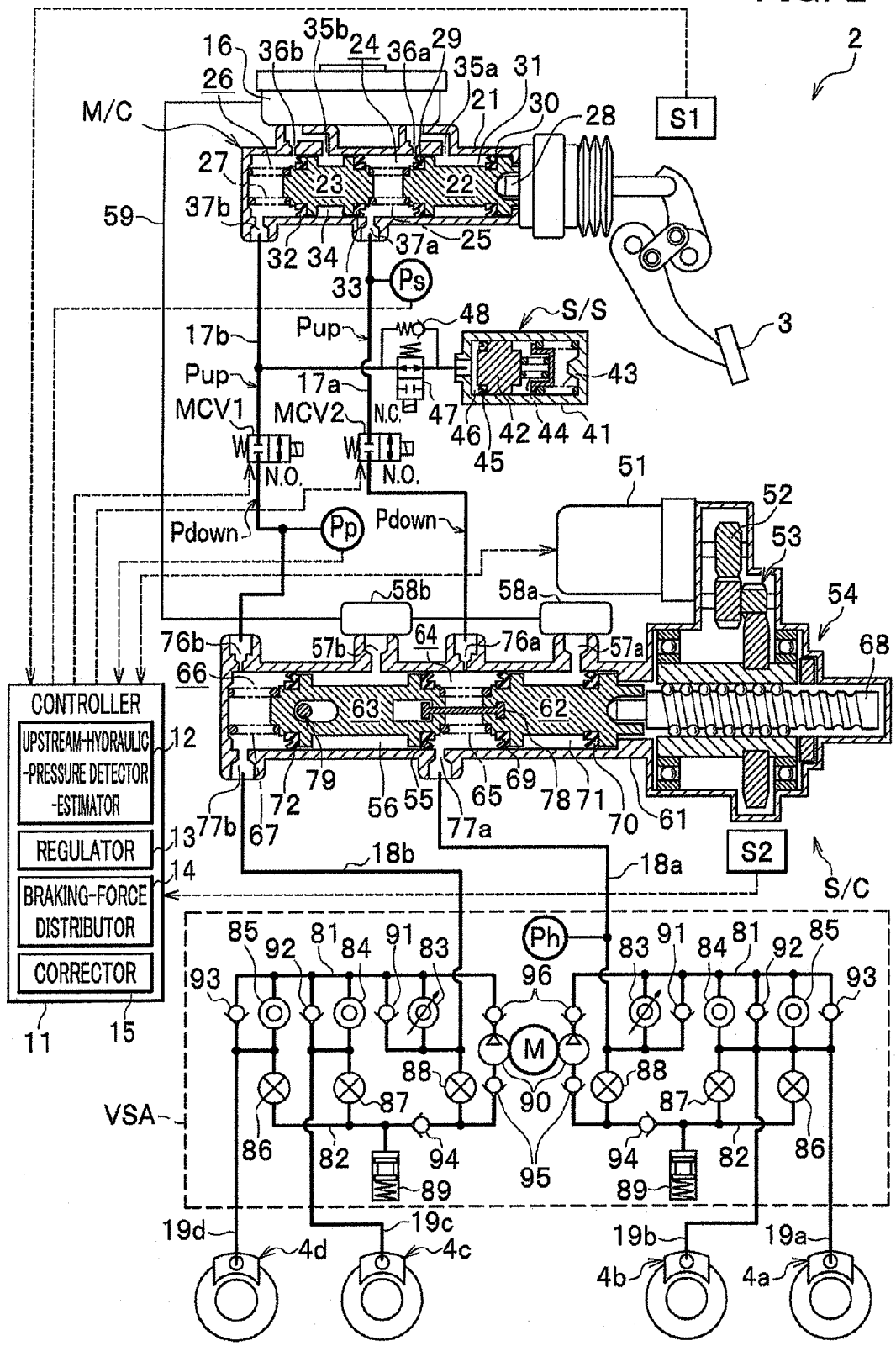
FIG. 2 is a structural diagram illustrating the vehicle braking system according to the embodiment of the present invention.

FIG. 2 is a structural diagram illustrating the vehicle braking system 2 according to the embodiment of the present invention. In FIG. 2, however, the whole vehicle braking system is indicated as the vehicle braking system 2 in addition to the vehicle braking system (main device) for the convenience of explanation. That is, the vehicle braking system 2 includes the brake pedal 3, the wheel cylinders 4a, 4b, 4c, and 4d, and the hydraulic-pressure channels 19a, 19b, 19c, and 19d. Moreover, the vehicle braking system 2 includes a stroke sensor (an operation amount detector) S1 that detects the operation amount of the brake pedal 3, a tandem master cylinder M/C for producing a hydraulic pressure through the operation to the brake pedal 3 given by the driver, first-hydraulic-pressure-system hydraulic-pressure channels 17a-18a-19a, 17a-18a-19b that connect a second hydraulic-pressure chamber 24 of the master cylinder M/C with the plurality of wheel cylinders 4a and 4b, and second-hydraulic-pressure-system hydraulic-pressure channels 17b-18b-19c, 17b-18b-19d that connect a first hydraulic-pressure chamber 26 of the master cylinder M/C with the plurality of wheel cylinders 4c and 4d.

The vehicle braking system 2 also includes a slave cylinder (hydraulic-pressure source) S/C. The slave cylinder S/C is disposed on the first-hydraulic-pressure-system hydraulic-pressure channel 17a-18a and the second-hydraulic-pressure-system hydraulic-pressure channel 17b-18b. The slave cylinder S/C applies downstream hydraulic-pressure Pdown of the first-hydraulic-pressure-system hydraulic-pressure channel 18a and the second-hydraulic-pressure-system hydraulic-pressure channel 18b based on the operation amount of the brake pedal 3 detected by the stroke sensor S.

The vehicle braking system 2 includes master cut valves (shut-off valves: normally open (N.O.)) MCV1 and MCV2. The master cut valve MCV1 is disposed on the second-hydraulic-pressure-system hydraulic-pressure channel 17b between the first hydraulic-pressure chamber 26 of the master cylinder M/C and a first hydraulic-pressure chamber 66 of the slave cylinder S/C. The master cut valve MCV2 is disposed on a first-hydraulic-pressure-system hydraulic-pressure channel 17a between the second hydraulic-pressure chamber 24 of the master cylinder M/C and a second hydraulic-pressure chamber 64 of the slave cylinder S/C. The master cut valves MCV1 and MCV2 exert closing force in accordance with an electrical quantity applied when those are in close-instruction receiving condition in which such valves are receiving a close instruction from a controller 11, thereby closing those valves themselves, and open in an open-instruction receiving condition in which such valves are receiving an open instruction.

The vehicle braking system 2 includes P sensors (pressure sensor, hydraulic-pressure detector) Pp and Ps. The P sensor Pp is disposed at the sides closer to the wheel cylinders 4c and 4d over the master cut valve MCV1 on the second-hydraulic-pressure-system hydraulic-pressure channel 17b. The P sensor Pp detects (measure) the downstream hydraulic pressure Pdown at the side closer to the wheel cylinders 4c and 4d over the master cut valve MCV1 on the second-hydraulic-pressure-system hydraulic-pressure channel 17b. The P sensor Ps is disposed at the side near the master cylinder M/C over the master cut valve MCV2 on the first-hydraulic-pressure-system hydraulic-pressure channel 17a. The P sensor Ps detects (measure) upstream hydraulic pressure Pup at the side near the master cylinder M/C over the master cut valve MCV2 on the first-hydraulic-pressure-system hydraulic-pressure channel 17a.

The vehicle braking system 2 includes, as other main components, a stroke simulator S/S, a vehicle stability assist VSA (registered trademark), and the controller 11.

The stroke simulator S/S is disposed at the side near the master cylinder M/C over the master cut valve MCV1 on the second-hydraulic-pressure-system hydraulic-pressure channel 17b. The stroke simulator S/S absorbs a brake fluid (brake fluid) fed from the first hydraulic-pressure chamber 26 of the master cylinder M/C.

The vehicle stability assist VSA is disposed between the slave cylinder S/C and the wheel cylinders 4a, 4b, 4c, and 4d, and further between a first-hydraulic-pressure-system hydraulic-pressure channel 18a and the hydraulic-pressure channels 19a and 19b. Moreover, the vehicle stability assist VSA is disposed between the second-hydraulic-pressure-system hydraulic-pressure channel 18b and the hydraulic-pressure channels 19c and 19d.

The controller 11 sets the target value of the downstream hydraulic pressure Pdown based on the operation amount of the brake pedal 3 detected by the stroke sensor (operation amount detector) S1, and controls the downstream hydraulic pressure Pdown based on that target value. The target value set is not limited as the target value of the downstream hydraulic pressure Pdown, and may be a control target value corresponding to the downstream hydraulic pressure Pdown, such as the actuated amount of the slave cylinder S/C. The controller 11 includes an upstream-hydraulic-pressure detector-estimator 12, a regulator 13, a braking-force distributor 14, and a corrector 15. The upstream-hydraulic-pressure detector-estimator 12 detects or estimates the upstream hydraulic pressure Pup. Hence, the upstream-hydraulic-pressure detector-estimator 12 may be also constructed by the P sensor Ps that detects (measure) the upstream hydraulic pressure Pup. Moreover, the upstream hydraulic pressure Pup may be estimated based on the operation amount, etc., detected by the stroke sensor (operation amount detector) S1. The regulator 13 regulates a pressure difference between the upstream hydraulic pressure Pup and the downstream hydraulic pressure Pdown. More specifically, the regulator 13 adjusts the target value of the downstream hydraulic pressure Pdown in such a way that the pressure difference is within a predetermined range. However, the regulator 13 may be configured to regulate the pressure difference between the upstream hydraulic pressure Pup and the downstream hydraulic pressure Pdown by adjusting the control target value in accordance with the operation amount of the brake pedal 3. The braking-force distributor 14 performs a control of changing a distribution ratio between the regenerative braking force by regenerative braking and the hydraulic-pressure braking force by the wheel cylinders 4a, 4b, 4c, and 4d, and of terminating the regenerative braking. When the target value of the downstream hydraulic pressure Pdown is adjusted by the regulating means 13, the braking-force distributor 14 changes again the distribution ratio in accordance with the adjusted target value.

The controller 11 sets, based on the correspondence relationship between the target value of the downstream hydraulic pressure Pdown and the actuated amount of the slave piston of the slave cylinder (hydraulic-pressure source) S/C, the actuated amount from the target level, and allows the slave cylinder (hydraulic-pressure source) S/C to produce the downstream hydraulic pressure Pdown based on the set actuated amount. The corrector 15 of the controller 11 corrects a correspondence relationship between the target level and the actuated amount when it is shifted due to a change over time. A specific example of a change over time is a worn-out of the brake pads of the respective wheel cylinders 4a, 4b, 4c, and 4d. The brake pads become gradually thin due to friction with the brake disc at the time of braking. In order to transfer the same downstream hydraulic pressure Pdown as the hydraulic pressure before the worn-out to the wheel cylinders 4a, 4b, 4c, and 4d even if the brake pads become thin, it is appropriate if respective strokes (actuated amounts) of a first piston 63 and a second piston 62 (slave piston) of the slave cylinder (hydraulic-pressure source) S/C are increased to feed a larger amount of the brake fluid to the wheel cylinders 4a, 4b, 4c, and 4d. Hence, the corrector 15 performs correction at a timing when the regulator 13 performs no regulating, i.e., a timing at which no braking is performed, in particular, a timing at which no regenerative braking is performed and a timing at which the vehicle braking system 2 is activated or deactivated. As a specific detail of the correction, the stroke (actuated amount) is set to be multiple predetermined numbers or is changed successively, and the downstream hydraulic pressure Pdown to the stroke (actuated amount) is measured through the P sensor Pp and a pressure sensor Ph. Based on this measurement result, the correspondence relationship between the target value of the downstream hydraulic pressure Pdown and the stroke (actuated amount) is updated (corrected).

The master cylinder M/C includes a second piston 22 and a first piston 23 engaged with a cylinder 21 in a freely slidable manner, has a second return spring 25 disposed in the second hydraulic-pressure chamber 24 defined ahead of the second piston 22, and has a first return spring 27 disposed in the first hydraulic-pressure chamber 26 defined ahead of the first piston 23. The second piston 22 has a rear end coupled with the brake pedal 3 via a push rod 28, and when the driver depresses the brake pedal 3, the first piston 23 and the second piston 22 move forward, thereby producing the upstream hydraulic pressure Pup in the first hydraulic-pressure chamber 26 and the second hydraulic-pressure chamber 24.

A second back chamber 31 is formed between a cup seal 29 of the second piston 22 and a cup seal 30 thereof, and a first back chamber 34 is formed between a cup seal 32 of the first piston 23 and a cup seal 33 thereof. The cylinder 21 is formed with, from the rear portion toward the front portion, a supply port 35a in communication with the second back chamber 31, a relief port 36a opened to the second hydraulic-pressure chamber 24 right before the cup seal 29, an output port 37a opened to the second hydraulic-pressure chamber 24, a supply port 35b in communication with the first back chamber 34, a relief port 36b opened to the first hydraulic-pressure chamber 26 right before the cup seal 32, and an output port 37b opened to the first hydraulic-pressure chamber 26. The supply port 35a and the relief port 36a are merged with each other, and are in communication with a reservoir 16. The supply port 35b and the relief port 36b are merged with each other, and are in communication with the reservoir 16. The output port 37a is connected with the hydraulic-pressure channel (first hydraulic-pressure system) 17a, while the output port 37b is connected with the hydraulic-pressure channel (second hydraulic-pressure system) 17b.

The stroke simulator S/S has a second return spring 44 with a low spring constant and a first return spring 43 with a high spring constant disposed in series to push a piston 42 in order to reduce the increase gradient of pedal counterforce at the initial stage of depression of the brake pedal 3, and to increase the increase gradient of the pedal counterforce at the latter stage of depression to enhance the pedal feeling of the brake pedal 3. A hydraulic-pressure chamber 46 is laid out at the opposite side of the second return spring 44 of the piston 42. The hydraulic-pressure chamber 46 is connected with the hydraulic-pressure channel (second hydraulic-pressure system) 17b through a shut-off valve (normally closed (N.C.)) 47. The shut-off valve (normally closed) 47 is connected with a check valve 48 in a parallel manner which allows the brake fluid to flow from the hydraulic-pressure chamber 46 to the hydraulic-pressure channel (second hydraulic-pressure system) 17b but does not allow the brake fluid to flow in the opposite direction. The piston 42 is provided with a cup seal 45, and thus no brake fluid leaks out over the cup seal 45 from the hydraulic-pressure chamber 46 even if the piston 42 slides in the cylinder 41.

The slave cylinder (hydraulic-pressure source) S/C has the second piston (slave piston) 62 and the first piston (slave piston) 63 which are engaged with the cylinder 61 in a freely slidable manner, has a second return spring 65 disposed in the second hydraulic-pressure chamber 64 laid out ahead of the second piston 62, and has a first return spring 67 disposed in the first hydraulic-pressure chamber 66 laid out ahead of the first piston 63. The second piston 62 has a rear end connected to a motor (electric motor) 51 through a push rod 68, a ball-screw mechanism 54, a reduction mechanism 53, and a gear 52, and those construct a motor cylinder (52, 53, 54, and 68). A stroke sensor (actuated amount detector) S2 detects the actuated amount of the first piston 63 and that of the second piston 62 (slave piston). The motor cylinder (52, 53, 54, and 68) and the stroke sensor (actuated amount detector) S2 construct an electric actuator (52, 53, 54, 68, and S2). When the motor (electric motor) 51 rotates under the braking control of the controller 11, the push rod 68 and further the first piston 63 and the second piston 62 (slave piston) move forward (are driven), and thus the downstream hydraulic pressure Pdown is produced in the first hydraulic-pressure chamber 66 and the second hydraulic-pressure chamber 64.

A second back chamber 71 is formed between a cup seal 69 of the second piston 62 and a cup seal 70 thereof, and a first back chamber 56 is formed between a cup seal 72 of the first piston 63 and a cup seal 55 thereof. A cylinder 61 is formed with, from the rear portion toward the front portion, a return port 57a in communication with the second back chamber 71, a relief port 76a opened to the second hydraulic-pressure chamber 64 ahead of the cup seal 69, an output port 77a opened to the second hydraulic-pressure chamber 64, a return port 57b in communication with the first back chamber 56, a relief port 76b opened to the first hydraulic-pressure chamber 66 ahead of the cup seal 72, and an output port 77b opened to the first hydraulic-pressure chamber 66. The relief port 76a is in communication with the hydraulic-pressure channel (first hydraulic-pressure system) 17a. The relief port 76b is in communication with the hydraulic-pressure channel (second hydraulic-pressure system) 17b. The return ports 57a and 57b are connected to the reservoir 16 through check valves 58a, 58b and a fluid channel 59. The output port 77a is connected with the hydraulic-pressure channel (first hydraulic-pressure system) 18a. The output port 77b is connected with the hydraulic-pressure channel (second hydraulic-pressure system) 18b.

When the vehicle braking system 2 breaks down such as the inoperable situation of the slave cylinder S/C, the master cut valves (shut-off valves: normally opened) MCV1 and MCV2 are opened, and the shut-off valve (normally closed) 47 are closed. The brake hydraulic pressure produced by the second hydraulic-pressure chamber 24 of the master cylinder M/C passes through the second hydraulic-pressure chamber 64 of the slave cylinder S/C to actuate the wheel cylinders 4a and 4b of the first hydraulic-pressure system, and the brake hydraulic pressure produced by the first hydraulic-pressure chamber 26 of the master cylinder M/C passes through the first hydraulic-pressure chamber 66 of the slave cylinder S/C to actuate the wheel cylinders 4c and 4d of the second hydraulic-pressure system. At this time, when the hydraulic-pressure channels (second hydraulic-pressure system) 18b, 19c, and 19d that connect the first hydraulic-pressure chamber 66 of the slave cylinder S/C with the wheel cylinders 4c and 4d of the second hydraulic-pressure system are defective, the hydraulic pressure in the first hydraulic-pressure chamber 66 is lost, the first piston 63 moves forward relative to the second piston 62, the volume of the second hydraulic-pressure chamber 64 increases, and thus the brake hydraulic pressure supplied to the wheel cylinders 4a and 4b of the first hydraulic-pressure system is likely to decrease. However, a distance regulator 78 restricts the maximum distance and the minimum distance between the first piston 63 and the second piston 62, and a sliding range regulator 79 restricts a sliding range of the first piston 63. Accordingly, it suppresses an increase in a volume of the second hydraulic-pressure chamber 64 even if the hydraulic pressure in the first hydraulic-pressure chamber 66 is lost, thereby securely actuating the wheel cylinders 4a and 4b of the first hydraulic-pressure system to ensure braking force.

According to the vehicle stability assist VSA, the structure of the first hydraulic-pressure system reaching the hydraulic-pressure channels 19a and 19b from the first hydraulic-pressure channel 18a is consistent with the structure of the second hydraulic-pressure system reaching the hydraulic-pressure channels 19c and 19d from the hydraulic-pressure channel 18b. Hence, in order to facilitate understanding, the corresponding portion between the first hydraulic-pressure system and the second hydraulic-pressure system in the vehicle stability assist VSA is denoted by the same reference numeral. An explanation will be below given of the first hydraulic-pressure system reaching the hydraulic-pressure channels 19a and 19b from the hydraulic-pressure channel 18a as an example.

The vehicle stability assist VSA includes a hydraulic-pressure channel 81 and a hydraulic-pressure channel 82 both common to the wheel cylinders 4a and 4b (4c and 4d), and includes a regulator valve (normally opened) 83 that is an always-opened solenoid valve with a variable open degree disposed between the hydraulic-pressure channel 18a (18b) and the hydraulic-pressure channel 81, a check valve 91 disposed in parallel with the regulator valve 83 and permitting the brake fluid to flow from the hydraulic-pressure channel 18a (18b) to the hydraulic-pressure channel 81, an in-valve (normally opened) 85 that is an always-opened solenoid valve disposed between the hydraulic-pressure channel 81 and the hydraulic-pressure channel 19a (19d), a check valve 93 disposed in parallel with the in-valve 85 and permitting the brake fluid to flow from the hydraulic-pressure channel 19a (19d) to the hydraulic-pressure channel 81, an in-valve (normally opened) 84 that is an always-opened solenoid valve disposed between the hydraulic-pressure channel 81 and the hydraulic-pressure channel 19b (19c), a check valve 92 disposed in parallel with the in-valve 84 and permitting the brake fluid to flow from the hydraulic-pressure channel 19b (19c) to the hydraulic-pressure channel 81, an out-valve (normally closed) 86 that is an always-closed solenoid valve disposed between the hydraulic-pressure channel 19a (19d) and the hydraulic-pressure channel 82, an out-valve (normally closed) 87 that is an always-closed solenoid valve disposed between the hydraulic-pressure channel 19b (19c) and the hydraulic-pressure channel 82, a reservoir 89 connected with the hydraulic-pressure channel 82, a check valve 94 disposed between the hydraulic-pressure channel 82 and the hydraulic-pressure channel 81 and permitting the brake fluid to flow from the hydraulic-pressure channel 82 to the hydraulic-pressure channel 81, a pump 90 disposed between the check valve 94 and the hydraulic-pressure channel 81 and supplying the brake fluid from the hydraulic-pressure channel 82 to the hydraulic-pressure channel 81, check valves 95 and 96 provided before and after the pump 90 and permitting the brake fluid to flow from the hydraulic-pressure channel 82 to the hydraulic-pressure channel 81, a motor (electric motor) M driving the pump 90, and a suction valve (normally closed) 88 that is an always-closed solenoid valve disposed between an intermitted position between the check valve 94 and the check valve 95 and the hydraulic-pressure channel 18a (18b). The hydraulic-pressure channel 18a is provided with, at the vehicle-stability-assist-VSA side, a pressure sensor Ph that detects the downstream hydraulic pressure Pdown produced by the slave cylinder S/C.

Figure 3:
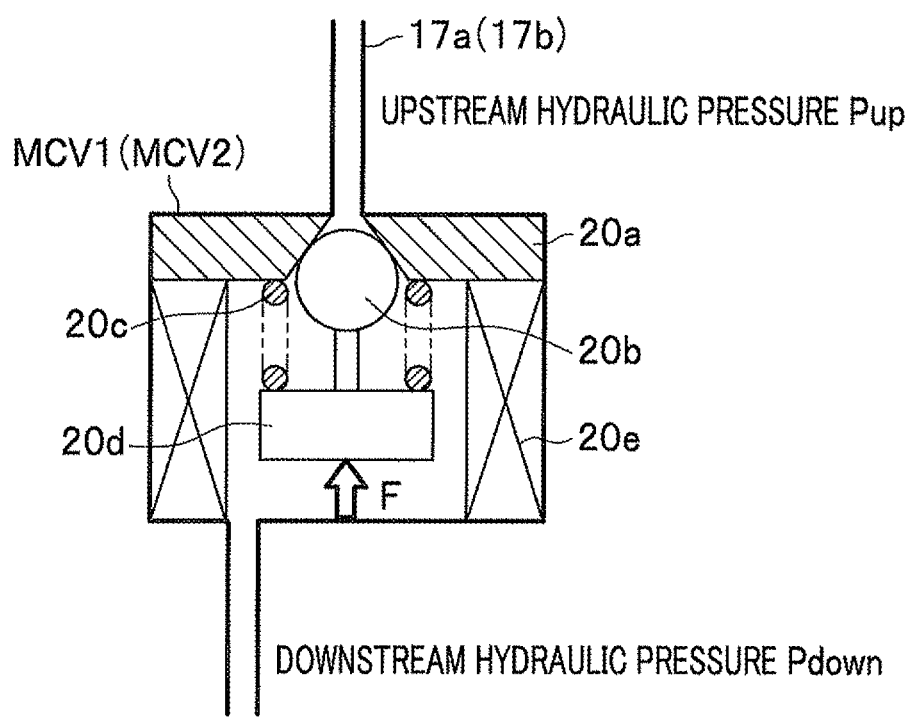
FIG. 3 is a structural diagram illustrating a master cut valve (a shut-off valve) used for the vehicle braking system of the embodiment of the present invention.

FIG. 3 is a structural diagram illustrating the master cut valves (shut-off valves) MCV1 and MCV2 used for the vehicle braking system 2 according to the embodiment of the present invention. When the vehicle braking system 2 does not perform regenerative braking but performs hydraulic-pressure braking only, a hydraulic pressure amplified at a predetermined boost ratio to the upstream hydraulic pressure Pup produced by the master cylinder M/C inherent to the depressing force of the driver is produced by the slave cylinder (hydraulic-pressure source) S/C as the downstream hydraulic pressure Pdown, and is applied to the wheel cylinders 4a, 4b, 4c and 4d. Hence, a condition in which the upstream hydraulic pressure Pup is less than the downstream hydraulic pressure Pdown that is the amplified upstream pressure is satisfied (Pup<Pdown). The master cut valves (shut-off valves) MCV1 and MCV2 are provided between the master cylinder for producing the upstream hydraulic pressure Pup and the slave cylinder (hydraulic-pressure source) S/C for producing the downstream hydraulic pressure Pdown.

Acting on respective valve elements 20b of the master cut valves (shut-off valves) MCV1 and MCV2 is a pressure difference between the upstream hydraulic pressure Pup and the downstream hydraulic pressure Pdown (Pdown−Pup (>0: in the same direction as that of thrust force F)). When the vehicle braking system 2 is in operation, the master cut valves (shut-off valves) MCV1 and MCV2 are closed in order to disconnect a communication between the master cylinder M/C and the slave cylinder (hydraulic-pressure source) S/C. In order to securely maintain this closed condition, the valve element 20b is disposed at the downstream-hydraulic-pressure-Pdown side with higher pressure relative to a valve seat 20a, and the valve element 20b is allowed to contact the valve seat 20a with pressure by utilizing the pressure difference (Pdown−Pup (>0)). Not only the pressure difference (Pdown−Pup (>0)) but also the thrust force F is applied to the valve element 20b in the direction contacting the valve seat 20a with pressure in a closed condition, and thus the closed condition is securely maintained. The thrust force F is produced by allowing a current to flow through a coil 20e under the control of the controller 11, and acts on a liner slider 20d. The linear slider 20d moves the valve element 20b in the direction of the valve seat 20a by the thrust force F while compressing a spring 20c to allow the valve element 20b to contact the valve seat 20a with pressure, thereby causing the master cut valves (shut-off valves) MCV1 and MCV2 to be closed.

Next, a case in which the vehicle braking system 2 performs not only the hydraulic-pressure braking but also the regenerative braking will be discussed. When the regenerative braking is also performed, in comparison with the case in which only the hydraulic-pressure braking is performed, the hydraulic-pressure braking force is required to be reduced by what corresponds to the regenerative braking force in order to equalize the action of the brakes. More specifically, the downstream hydraulic pressure Pdown is required to be reduced. Conversely, the upstream hydraulic pressure Pup depends on the depressed force by the driver and does not depend on the presence/absence of the regenerative braking. Hence, the maintained relationship that the upstream hydraulic pressure Pup is less than the downstream hydraulic pressure Pdown (Pup<Pdown) is changed and the downstream hydraulic pressure Pdown becomes less than the upstream hydraulic pressure Pup (Pup>Pdown). Moreover, when the downstream hydraulic pressure Pdown becomes small, the pressure difference (Pup−Pdown (>0 in the opposite direction to the thrust force F) becomes greater than the thrust force F (Pup−Pdown>F). At this time, the valve element 20b does not contact the valve seat 20a with a pressure, and thus the master cut valves (shut-off valves) MCV1 and MCV2 tend to be in an open condition. Hence, according to the present embodiment, the possible value of the pressure difference (Pup−Pdown), i.e., the possible value of the downstream hydraulic pressure Pdown is regulated so as to prevent the pressure difference (Pup−Pdown) from becoming greater than the thrust force F (Pup−Pdown>F).

Figure 4:
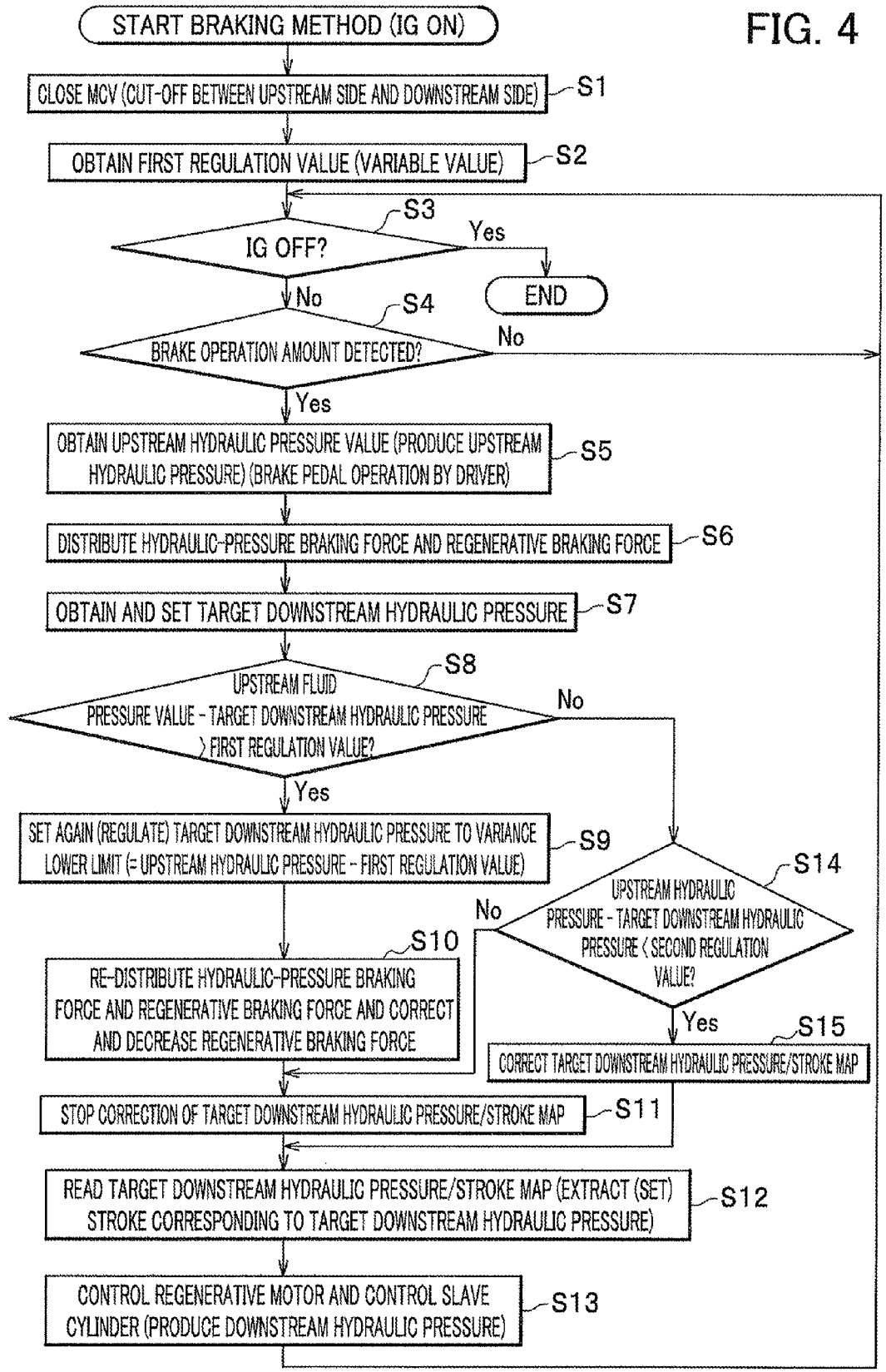
FIG. 4 is a flowchart illustrating a braking method performed by the vehicle braking system of the embodiment of the present invention.

FIG. 4 is a flowchart of a braking method performed by the vehicle braking system 2 according to the embodiment of the present invention.

The braking method performed by the vehicle braking system 2 starts when the driver of the vehicle 1 turns on the ignition switch IG.

First, the controller 11 transmits in step S1 a close instruction to the master cut valves (shut-off valves: normally opened) MCV1 and MCV2, to allow the master cut valves MCV1 and MCV2 to be closed. Upon this valve closing, the upstream side of the master cut valves MCV1 and MCV2 (the master-cylinder-M/C side) and the downstream side (the slave-cylinder (hydraulic-pressure source) S/C side) become unable to transfer the hydraulic pressure from each other and are cut off. That is, the hydraulic pressure at the upstream side (upstream hydraulic pressure Pup) is not transferred as the hydraulic pressure at the downstream side (downstream hydraulic pressure Pdown), but the downstream hydraulic pressure Pdown is set and controlled independently from the upstream hydraulic pressure Pup.

In the closed condition, more specifically, by applying a predetermined voltage to and allowing a predetermined current to flow through the coils 20e of the master cut valves MCV1 and MCV2, the thrust force F is produced. The magnitude of the thrust force F is proportional to the magnitude of the applied current and voltage. There is an unavoidable difference for each vehicle braking system 2, and such an unavoidable difference may appear as the variance in the applied current and voltage and the thrust force F for each system. Moreover, the applied current and voltage and the produced thrust force F change due to deterioration with age. As explained above, the thrust force F is taken as a variable value.

Moreover, the controller 11 transmits an open instruction to the shut-off valve 47 to allow the shut-off valve 47 to be opened. The opening of the shut-off valve 47 allows the stroke simulator S/S to apply appropriate reactive force to the brake pedal 3 while absorbing the brake fluid flowing in accordance with the operation given to the brake pedal 3.

Next, the controller 11 obtains in step S2 a first regulation value (variable value) based on the current and voltage applied to the coils 20*e* of the master cut valves MCV1 and MCV2. The first regulation value (variable value) corresponds to, when it is attempted to act the thrust force F (variable value) and pressure (upstream hydraulic pressure Pup) on the valve element 20*b* to obtain a balanced condition, the magnitude of that pressure. The first regulation value (variable value) is obtained by estimating the thrust force F (variable value) based on the current and voltage applied to the coil 20*e*, and by dividing the thrust force F (variable value) by the area of the valve element 20*b* exposed to the upstream-side brake fluid. Hence, when the thrust force F is a variable value, the first regulation value becomes also a variable value. According to the present embodiment, in order to facilitate understanding, and explanation will be occasionally given of an example case in which 12 V is applied to the coils 20*e* of the master cut valves MCV1 and MCV2 to actuate such valves, and 6 MPa is obtained as the first regulation value.

The controller 11 determines in step S3 whether or not the ignition switch IG is turned off by the driver. When determining that the ignition switch it turned off, the controller terminates the braking method performed by the vehicle braking system 2 (step S3: YES). When determining that the ignition switch is not turned off, the process proceeds to step S4 (step S3: NO).

The upstream-hydraulic-pressure detector-estimator 12 of the controller 11 determines in the step S4 whether or not the stroke sensor (operation amount detector) S1 detects a brake operation (brake operation amount). When a brake operation amount which is equal to or greater than a predetermined value and is corresponding to the operation given to the brake pedal (brake operation part) 3 by the driver is detected (step S4: YES), the process proceeds to step S5, and when no such a level is detected (step S4: NO), the process returns to the step S3.

The upstream-hydraulic-pressure detector-estimator 12 of the controller 11 obtains in the step S5 a value (upstream hydraulic pressure value) of the upstream hydraulic pressure Pup produced inherent to the brake pedal operation given by the driver. The upstream hydraulic pressure Pup (upstream hydraulic pressure value) is estimated by utilizing a correspondence relationship between the brake operation amount and the upstream hydraulic pressure value obtained in advance based on the brake operation amount detected by the stroke sensor (operation amount detector) S1. Alternatively, the upstream hydraulic pressure Pup (upstream hydraulic pressure value) may be detected through the P sensor Ps. As a specific example, it is presumed that the estimated upstream hydraulic pressure Pup (upstream hydraulic pressure value) based on the brake operation amount of 100 mm is 10 MPa.

The braking-force distributor 14 of the control controller 11 calculates in step S6 a necessary total braking force obtained by adding the hydraulic-pressure braking force with the regenerative braking force based on the brake operation amount. The braking-force distributor 14 calculates (maximum) regenerative force based on the brake operation amount, the electric level (charge, power) that is yet stored in the battery 9 (see FIG. 1), and the maximum value of the present charging current, etc. Moreover, the braking-force distributor 14 moderates and adjusts the calculated regenerative braking force, subtracts the regenerative braking force from the total braking force, and calculates the hydraulic-pressure braking force. Hence, the regenerative braking force and the hydraulic-pressure braking force are distributed in this manner. This distribution method is merely an example, and is not limited to this example and various distribution methods are applicable.

The controller 11 obtains and sets in step S7 the target value (target downstream hydraulic pressure) of the downstream hydraulic pressure Pdown to be produced at the slave cylinder (hydraulic-pressure source) S/C. The target downstream hydraulic pressure is set based on the distributed hydraulic-pressure braking force and further the brake operation amount, etc. As a specific example, it is presumed that the target downstream hydraulic pressure is set to be 20 MPa based on the brake operation amount of 100 mm when no regenerative braking force is generated and the target downstream hydraulic pressure is set to be 0 MPa (when the distribution to the hydraulic-pressure braking force is zero) when the regenerative braking force is generated based on the former brake operation amount.

The regulator 13 of the controller 11 determines in step S8 whether or not a value obtained by subtracting the target downstream hydraulic pressure obtained in the step S7 from the upstream hydraulic pressure value obtained in the step S5 is greater than the first regulation value obtained in the step S2 (upstream hydraulic pressure value–target downstream hydraulic pressure>first regulation value). More specifically, when the value obtained by subtracting the target downstream hydraulic pressure from the upstream hydraulic pressure value is greater than the first regulation value, the upstream hydraulic pressure becomes greater than the (target) downstream hydraulic pressure and the first regulation value, moves the valve elements 20*b*, and the master cut valves MCV1 and MCV2 tend to open even though those are in the close-instruction receiving condition.

When the value obtained by subtracting the target downstream hydraulic pressure from the upstream hydraulic pressure value is greater than the first regulation value (when the master cut valves MCV1 and MCV2 tend to open) (step S8: YES), the process proceeds to step S9, and when such a value is not greater than the first regulation value (when those valves do not tend to open) (step S8: NO), the process proceeds to step S14. More specifically, when the first regulation value that is 6 MPa is obtained, the upstream hydraulic pressure Pup (upstream hydraulic pressure value) is 10 MPa, and the target downstream hydraulic pressure that does not generate the regenerative braking force is set to 20 MPa, the value (−10 MPa) obtained by subtracting the target downstream hydraulic pressure 20 MPa from the upstream hydraulic pressure value 10 MPa does not exceed the first regulation value 6 MPa, and thus the process progresses to the step S14. Conversely, as a specific example, when the first regulation value that is 6 MPa is obtained, the upstream hydraulic pressure Pup (upstream hydraulic pressure value) is 10 MPa, and the target downstream hydraulic pressure that generates the regenerative braking force is set to 0 MPa, the value (+10

MPa) obtained by subtracting the target downstream hydraulic pressure 0 MPa from the upstream hydraulic pressure value 10 MPa is greater than the first regulation value 6 MPa, the process progresses to the step S9.

The regulation means 13 of the controller 11 sets in the step S9 the target downstream hydraulic pressure to a variance lower limit value, thereby regulating the variable. The target downstream hydraulic pressure is once set in the step S7, and set again (resetting) in the step S9. The variance lower limit value is set to be a value obtained by subtracting the first regulation value from the upstream hydraulic pressure Pup (upstream hydraulic pressure value) (variance lower limit value=upstream hydraulic pressure value−first regulation value). According to such a regulation, an inequality equation that the value obtained by subtracting the target downstream hydraulic pressure from the upstream hydraulic pressure value and determined in the step S8 is greater than the first regulation value (upstream hydraulic pressure value−target downstream hydraulic pressure>first regulation value) is no longer satisfied, and the master cut valves MCV1 and MCV2 are prevented from being opened.

As a specific example, when the first regulation value that is 6 MPa is obtained, the upstream hydraulic pressure Pup (upstream hydraulic pressure value) is 10 MPa, and the target downstream hydraulic pressure that generates the regenerative braking force is set to 0 MPa, the target downstream hydraulic pressure is set again to the variance lower limit value 4 MPa (=10 MPa−6 MPa) obtained by subtracting the first regulation value 6 MPa from the upstream hydraulic pressure value 10 MPa. The target downstream hydraulic pressure is set again to 4 MPa from 0 MPa that has been set previously, and is set again in the increment direction. Next, the value (pressure difference) obtained by subtracting the target downstream hydraulic pressure from the upstream hydraulic pressure value becomes less than that of the step S8, and is regulated so as to be less than the first regulation value. Accordingly, the cut-off between the upstream side and the downstream side by the master cut valves MCV1 and MCV2 is performed completely regardless of the presence/absence of the regenerative braking.

The braking-force distributor 14 of the controller 11 distributes again in step S10 the hydraulic-pressure braking force and the regenerative braking force. Since the target downstream hydraulic pressure is set again in the step S9 in the direction increasing over the value set in the step S7, the hydraulic-pressure braking force becomes greater than the value distributed in the step S6 when the hydraulic-pressure braking force is calculated based on the increased target downstream hydraulic pressure. It is unnecessary to change the magnitude of the total braking force, and a correction of decreasing the regenerative braking force by what corresponds to the increase in the hydraulic-pressure braking force is performed. More specifically, the motor (electric motor) 6 (see FIG. 1) is controlled (an unillustrated inverter is controlled) to be driven in a direction of decreasing the speed of obtaining the regenerative energy level.

The corrector 15 of the controller 11 determines in the step S14 whether or not the value (pressure difference) obtained by subtracting the target downstream hydraulic pressure obtained in the step S7 from the upstream hydraulic pressure value obtained in the step S5 is less than a second regulation value that is less than the first regulation value (upstream hydraulic pressure value−target downstream hydraulic pressure<second regulation value (<first regulation value)). When the value (pressure difference) obtained by subtracting the target downstream hydraulic pressure from the upstream hydraulic pressure value is less than the second regulation value (step S14: YES), the process proceeds to step S15, and when such a value is not less than the second regulation value (step S14: NO), the process proceeds to step S11.

When the value obtained by subtracting the target downstream hydraulic pressure from the upstream hydraulic pressure value is less than the first regulation value, the master cut valves MCV1 and MCV2 do not open, but may open when there is instantaneous pressure variance. Hence, the second regulation value is set to be less than the first regulation value in order to pick out a further securely closed condition. In this condition, the downstream hydraulic pressure Pdown is further securely isolated from the upstream hydraulic pressure Pup, the downstream hydraulic pressure Pdown becomes stable, and thus the correction of the target downstream hydraulic pressure/stroke map performed in the step S15 while measuring the downstream hydraulic pressure Pdown is performed highly precisely. According to the above-explained reason, the second regulation value is set in advance to a value obtained by subtracting an expected value of the instantaneous pressure variance from the first regulation value. When it is determined that the downstream hydraulic pressure Pdown is sufficiently greater than the upstream hydraulic pressure Pup, a structure may be employed which reduces the thrust force of the solenoids that drive the master cut valves MCV1 and MCV2 so as to be closed.

As illustrated in FIG. 5, the corrector 15 of the controller 11 corrects a correspondence relationship (target downstream hydraulic pressure/stroke map) which is between the target value (target downstream hydraulic pressure: vertical axis) of the downstream hydraulic pressure Pdown and the stroke (actuated amount: horizontal axis) of the slave cylinder (hydraulic-pressure source) S/C for producing such a target value (target downstream hydraulic pressure) and which is stored in advance in the controller 11. In the correction, the downstream hydraulic pressure Pdown relative to the stroke (actuated amount) is measured through the P sensor Pp or the pressure sensor Ph while setting the stroke (actuated amount) to be a plurality of predetermined values and successively changing the stroke. This measurement result is the correspondence relationship between the stroke (actuated amount) and the downstream hydraulic pressure Pdown produced in accordance with the stroke (actuated amount), but the stroke (actuated amount) and the downstream hydraulic pressure Pdown corresponds to each other in a one-on-one manner. Accordingly, in order to produce a desired downstream hydraulic pressure Pdown (target value (target downstream hydraulic pressure)), it is necessary to actuate the slave cylinder (hydraulic-pressure source) S/C by the corresponding stroke (actuated amount). Hence, the correspondence relationship (target downstream hydraulic pressure/stroke map) between the target value (target downstream hydraulic pressure) of the downstream hydraulic pressure Pdown and the stroke (actuated amount) of the slave cylinder (hydraulic-pressure source) S/C necessary for producing such a target value (target downstream hydraulic pressure) is newly created and corrected based on the correspondence relationship between the stroke (actuated amount) that is the measurement result and the downstream hydraulic pressure Pdown produced in accordance with that stroke (actuated amount). Next, the corrected target downstream hydraulic pressure/stroke map is stored in a manner overwritten on the target downstream hydraulic pressure/stroke map stored in advance in the controller 11, i.e., updating the map. The process proceeds to step S12 after the correction.

The step S11 is a step provided to clarify that the correction in the step S15 is stopped and not carried out when the determination in the step S14 is negative and after the execution of the step S10.

The controller S12 reads in the step S12 the target downstream hydraulic pressure/stroke map stored in the controller 11. The latest target downstream hydraulic pressure/stroke map becomes available through the steps S14 and S15. The stroke (actuated amount) of the slave cylinder (hydraulic-pressure source) S/C corresponding to the target downstream hydraulic pressure set in the steps S7 and S9 is extracted and set using that target downstream hydraulic pressure/stroke map.

The controller S12 performs in step S13 regenerative motor control and slave cylinder control, and the process returns to the step S3. As an example regenerative motor control, the controller S12 drives the motor (electric motor) 6 (more specifically, unillustrated inverter) while monitoring the speed of obtaining the regenerative energy level in such a way that the motor (electric motor) 6 (see FIG. 1) outputs the regenerative braking force distributed in the steps S6 and S10. As an example slave cylinder control, the stroke (actuated amount) of the slave cylinder (hydraulic-pressure source) S/C is subjected to feedback control based on the stroke (actuated amount) extracted and set in the step S12. The target downstream hydraulic pressure set in the steps S7 and S9 is produced as the downstream hydraulic pressure Pdown, and thus the upstream side and the downstream side are completely cut off by the master cut valves MCV1 and MCV2 regardless of the presence/absence of the regenerative braking. This complete cut-off prevents the brake fluid from falling into the downstream side from the upstream side, the shifting of the downstream hydraulic pressure due to the increase in the brake fluid at the downstream side is reduced, the driver is prevented from feeling discomfort at the time of brake operation, and thus the feeling during the operation is improved.

1 Vehicle
2 Vehicle braking system (main device)
3 Brake pedal (brake operation part)
4a, 4b, 4c, 4d Wheel cylinder (W/C)
6 Motor (electric motor) (regenerative motor)
8a, 8b Axle
10 Wheel
11 Controller
12 Upstream-hydraulic-pressure detector
13 regulator
14 Braking-force distributor
15 Corrector
17a, 18a, 19a, 19b Hydraulic-pressure channel (first hydraulic-pressure system)
17b, 18b, 19c, 19d Hydraulic-pressure channel (second hydraulic-pressure system)
51 Motor
61 Cylinder (motor cylinder)
62 Second piston (slave piston)
63 First piston (slave piston)
M/C Master cylinder
MCV1, MCV2 Master cut valve (shut-off valve: normally opened)
Pp, PsP sensor (pressure sensor, hydraulic-pressure detector)
S1 Stroke sensor (operation amount detector)
S2 Stroke sensor (actuated amount detector)
S/C Slave cylinder (hydraulic-pressure source)
S/S Stroke simulator
VSA Vehicle stability assist

The invention claimed is:

1. A vehicle braking system comprising:
a master cylinder for producing an upstream hydraulic pressure in response to an operation given to a brake operation part;
an operation amount detector for detecting an operation amount of the brake operation part;
a shut-off valve provided between the master cylinder and a wheel cylinder;
a hydraulic-pressure source for producing a downstream hydraulic pressure between the shut-off valve and the wheel cylinder in a close instruction receiving condition of the shut-off valve; and
a controller for setting a control target value in response to the downstream hydraulic pressure based on the operation amount and controlling the downstream hydraulic pressure based on the control target value, wherein
the controller comprises:
an upstream-hydraulic-pressure detector-estimator for detecting or estimating the upstream hydraulic pressure; and
a regulator for adjusting the control target value in response to the operation amount or the upstream hydraulic pressure to regulate a pressure difference between the upstream hydraulic pressure and the downstream hydraulic pressure,
wherein the upstream hydraulic pressure moves a valve element of the shut-off valve to open, and
wherein if a value obtained by subtracting the control target value from the operation amount or the upstream hydraulic pressure is greater than a regulation value in a closed condition of the shut-off valve, the regulation value is adjusted by the controller.

2. The vehicle braking system according to claim 1, wherein the regulator drives the hydraulic-pressure source in a direction of reducing the pressure difference when the pressure difference is greater than a regulation value.

3. The vehicle braking system according to claim 2, wherein the controller:
includes braking-force distributor for setting a distribution between regenerative braking force to a wheel by an electric motor that drives the wheel and hydraulic-pressure braking force to the wheel by the downstream hydraulic pressure transferred from the hydraulic-pressure source to the wheel cylinder based on the operation amount;
sets the control target value based on the distribution to the hydraulic-pressure braking force; and
performs re-distribution so as to reduce the distribution to the regenerative braking force when the regulator regulates the pressure difference.

4. The vehicle braking system according to claim 2, wherein
the hydraulic-pressure source comprises an electric actuator that is driven to produce the downstream hydraulic pressure between the shut-off valve and the wheel cylinder,
the electric actuator comprises:
a motor cylinder for driving a slave piston by thrust force of a motor to produce the downstream hydraulic pressure; and
an actuated amount detector for detecting an actuated amount of the slave piston,
the controller sets the actuated amount from the control target value based on a correspondence relationship between the control target value and the actuated amount, and allows the hydraulic-pressure source to produce the downstream hydraulic pressure based on the actuated amount, and the controller includes a corrector for correcting the correspondence relationship between the control target value and the actuated amount when the pressure difference is equal to or less than the regulation value.

5. The vehicle braking system according to claim 1, wherein the controller:

includes braking-force distributor for setting a distribution between regenerative braking force to a wheel by an electric motor that drives the wheel and hydraulic-pressure braking force to the wheel by the downstream hydraulic pressure transferred from the hydraulic-pressure source to the wheel cylinder based on the operation amount;

sets the control target value based on the distribution to the hydraulic-pressure braking force; and performs re-distribution so as to reduce the distribution to the regenerative braking force when the regulator regulates the pressure difference.

6. The vehicle braking system according to claim 1, wherein the hydraulic-pressure source comprises an electric actuator that is driven to produce the downstream hydraulic pressure between the shut-off valve and the wheel cylinder, the electric actuator comprises:

a motor cylinder for driving a slave piston by thrust force of a motor to produce the downstream hydraulic pressure; and an actuated amount detector for detecting an actuated amount of the slave piston, and the controller sets the actuated amount from the control target value based on a correspondence relationship between the control target value and the actuated amount, and allows the hydraulic-pressure source to produce the downstream hydraulic pressure based on the actuated amount.

7. The vehicle braking system according to claim 1, wherein the hydraulic-pressure source comprises an electric actuator that is driven to produce the downstream hydraulic pressure between the shut-off valve and the wheel cylinder, the electric actuator comprises:

a motor cylinder for driving a slave piston by thrust force of a motor to produce the downstream hydraulic pressure; and an actuated amount detector for detecting an actuated amount of the slave piston, the controller sets the actuated amount from the control target value based on a correspondence relationship between the control target value and the actuated amount, and allows the hydraulic-pressure source to produce the downstream hydraulic pressure based on the actuated amount, and the controller includes a corrector for correcting the correspondence relationship between the control target value and the actuated amount when the pressure difference is equal to or less than the regulation value.

* * * * *